UNITED STATES PATENT OFFICE.

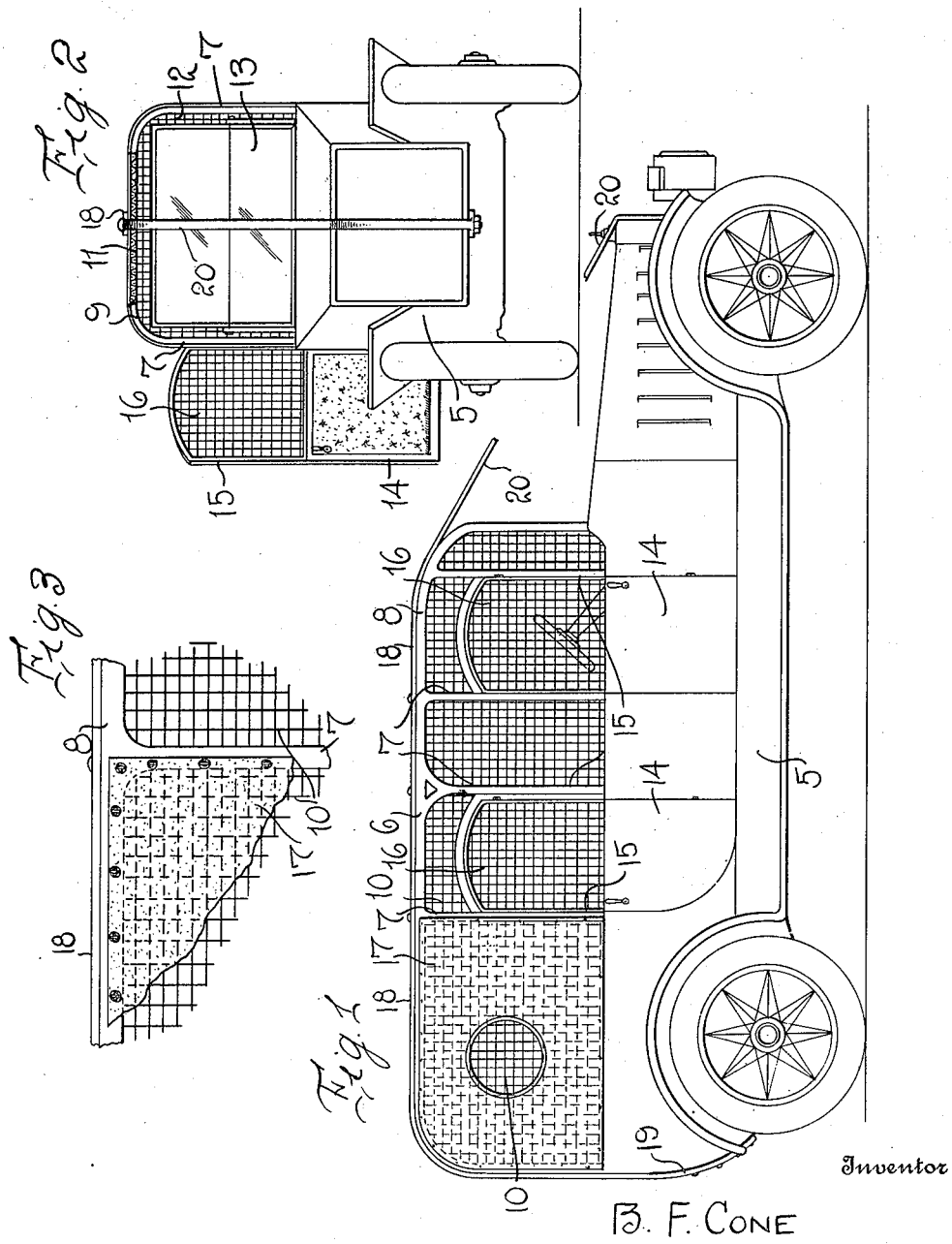

BENJAMIN F. CONE, OF ASHLAND, NEBRASKA.

GUARD FOR VEHICLES.

1,203,706.  Specification of Letters Patent.  Patented Nov. 7, 1916.

Application filed February 2, 1916. Serial No. 75,876.

*To all whom it may concern:*

Be it known that I, BENJAMIN F. CONE, a citizen of the United States, residing at Ashland, in the county of Saunders and State of Nebraska, have invented certain new and useful Improvements in Guards for Vehicles, of which the following is a specification, reference being had to the accompanying drawings.

This invention relates to guards for vehicles and has for its primary object to provide a device of this character particularly designed for use upon motor vehicles so as to effectually prevent injury to the occupants.

It is another and more particular object of the invention to provide a device of the above character embodying a suitable frame structure extending above the body walls of the vehicle and constituting a component part of the body structure, reticulated material secured to the sides, top and rear end of the frame, and wire mesh work extensions carried by the vehicle doors to fit within said frame when the doors are closed.

It is an additional general object of the invention to produce a device of the above character which is simple and inexpensive in its construction, will not detract from the appearance of the vehicle, and is highly serviceable and efficient for the purpose in view.

With the above and other objects in view, my invention consists in the novel features of construction, combination and arrangement of parts to be hereinafter more fully described, claimed and illustrated in the accompanying drawing, in which, Figure 1 is a side elevation of a motor vehicle equipped with my improved guard; Fig. 2 is a front elevation thereof, one of the doors being open; and Fig. 3 is an enlarged detail elevation of a portion of the guard with a curtain attached thereto.

Referring in detail to the drawing, 5 designates a motor vehicle which is for illustrative purposes only and may be of any of the various types now upon the market. In the body walls of this vehicle, a metal framework 6 is embodied which extends upwardly a considerable distance above the main body walls, said frame being preferably constructed of angle iron. This frame includes a plurality of spaced vertical uprights 7 connecting the top longitudinal bars 8, the corresponding uprights being preferably connected together by transverse arches, indicated at 9. To this frame structure, at opposite sides of the vehicle, the wire mesh work or other reticulated fabric, shown at 10, is secured, and a similar reticulated top wall 11 is also suitably fixed to the frame bars. The rear end of this frame is closed by the wire mesh wall 12 while the front end of the frame is open and is occupied by the wind shield indicated at 13.

14 designates the usual vehicle doors whereby entrance may be had to the interior of the vehicle body, and each of these doors is provided with an upwardly extending frame 15 upon which the wire fabric 16 is secured. These mesh covered frames fit within openings in the opposite side walls 10 of the guard, as clearly shown in Fig. 1, when the doors are closed.

From the above, it will be seen that the occupants of the vehicle will be entirely inclosed and protected by the wire mesh walls of the guard, which, however, does not materially interfere with clear vision though they effectually prevent flying stones, the limbs of trees, or other objects from striking the occupants. The heavy metal framework also affords protection to the passengers in the event of collision or the overturning of the vehicle, and as this framework reinforces the vehicle body, serious damage or injury thereto in the event of accident, is reduced to a minimum. The mesh of the wire walls is sufficiently close to prevent the arms being extended therethrough.

In Fig. 3, I have shown a storm curtain 17 applied to the rear end of the guard, and any desired number of these storm curtains may be secured to the frame structure 6 by suitable turn buttons or other convenient means.

For the purpose of reinforcing and strengthening the frame structure 6, I provide a rod or bar 18 extending centrally over the top of said frame and bolted or riveted to the transverse bars thereof, and extending downwardly at the rear end of the vehicle, as indicated at 19, the lower end of said bar being suitably fixed to the floor or body of the vehicle. From the frame 6, this reinforcing bar extends obliquely downwardly to the front of the radiator, as shown at 20, and vertically over the front wall of the radiator, and is suitably fixed to the base thereof. In this manner, it will be seen that the frame is effectively reinforced to withstand heavy shocks and the inclined portion 20 of the reinforcing bar also serves as a protection to the vehicle engine in the event of collision.

From the foregoing description, taken in connection with the accompanying drawing, the construction, manner of operation and several advantages of the invention will be clearly and fully understood. My improved guard may obviously be modified in many minor respects so as to enable the same to be applied to vehicle bodies of different types and this guard may be of other metal forms or shapes than that illustrated in the drawing. The device in no way interferes with the free entrance to or exit from the vehicle, or to the enjoyment of the occupants. The frame structure may also be constructed in sections if desired, and detachably connected together and mounted upon the vehicle body.

While I have shown and described the preferred construction and arrangement of the several parts of the device, it is to be understood that the same is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

The combination with a vehicle body, of a frame structure secured thereto and extending above the side and rear walls of the body, reticulated side, top and rear end walls secured to the frame structure, said frame structure terminating a predetermined point inwardly of the front end of the vehicle body, the forward end of the frame being open, and a longitudinally disposed reinforcing bar extending centrally over the top of the frame structure and secured thereto, and downwardly to the rear end thereof and having its lower end fixed to the vehicle body, said reinforcing bar at its forward end being downwardly inclined from the frame structure to the front end of the vehicle body and fixed thereto.

In testimony whereof I hereunto affix my signature in the presence of two witnesses.

BENJAMIN F. CONE.

Witnesses:
GEORGE HOFFMAN,
G. M. KELLER.